United States Patent [19]
Fathauer

[11] 3,761,810
[45] Sept. 25, 1973

[54] DIGITAL READING MOISTURE TESTER
[75] Inventor: George H. Fathauer, Decatur, Ill.
[73] Assignee: Burrows Equipment Company, Evanston, Ill.
[22] Filed: Feb. 8, 1971
[21] Appl. No.: 113,588

[52] U.S. Cl. ............................ 324/61 R, 324/78 D
[51] Int. Cl. ...................... G01r 27/26, G01r 23/02
[58] Field of Search ............................... 324/61, 78

[56] References Cited
UNITED STATES PATENTS
3,217,144  11/1965  Hinnah ............................ 324/78 D
3,226,635  12/1965  Moe ................................. 324/61 R Primary Examiner—Alfred E. Smith
Attorney—Pendleton, Neuman, Williams & Anderson

[57] ABSTRACT

A digital reading grain moisture tester is disclosed in which the frequency of an LC oscillator having as one element a capacitive cell containing a measured weight of the material under test is determined by counting the number of cycles occurring during a period of defined length. Circuitry is provided to vary the length of the counting period to compensate for differences in the physical properties of the grains which may be tested and for variations in the sample temperature. Automatic balance circuitry is provided to compensate for changes in the circuit parameters of the elements within the tester.

19 Claims, 12 Drawing Figures 3,761,810

INVENTOR
George H. Fathauer
by Pendleton, Neuman,
Williams & Anderson
Att'ys

CORN-CEREAL

WHEAT-CEREAL

OATS-CEREAL

SOYBEANS-FEED

FLAX-FEED

DIGITAL READING MOISTURE TESTER

BACKGROUND OF THE INVENTION

This invention relates generally to electrical circuits for measuring the frequency of an input signal and, more particularly, to frequency indicating circuits including means for altering the relation between the input signal frequency and the circuit output to compensate for known physical phenomena and, still more particularly, to digital reading grain moisture testers having provisions for automatically compensating for the physical characteristics of the grain under test, the temperature of the particular sample being tested, and variations in the circuit parameters of the tester itself. While the invention will be described with reference to a grain moisture tester, it will be obvious to those skilled in the art that it is of much broader application.

Grain moisture testers are well known. They most often include a cell comprising two electrodes physically disposed so that a measured amount of grain may be placed therebetween. Electric circuitry is provided so that the difference in the electrical capacity of the cell between its loaded and unloaded states may be determined. That capacitive difference is, of course, an indication of the dielectric constant of the grain placed within the cell which may easily be related to the moisture content of the grain under test.

Many moisture testers have been proposed in the past; most have used some type of impedance device which was either manually or automatically variable. In general form, they usually included means for comparing the capacitances of the cell and the variable impedance device and means for adjusting the variable impedance until a predetermined relation between those capacitances was obtained, the magnitude of the required adjustment indicating the cell capacitance, the dielectric constant of the grain, and, thus, the grain moisture content. The conversion from capacitance to moisture content was often accomplished by using some type of graphical chart. But, since the relationship between dielectric constant and moisture content is different for different types of grain, a separate scale had to be used for each type of grain tested. Further, since that relationship also varies with the temperature of the grain, the resultant measurement usually then had to be corrected for temperature. See, for example, U.S. Pat. No. 3,051,894 issued Aug. 28, 1962, to D. F. Fathauer for Impedance Indicating Instrument, or my U.S. Pat. No. 3,675,120 issued July 4, 1972. Alternatively, U.S. Pat. No. 3,231,814 to D. F. Fathauer, et al., issued Jan. 25, 1966, for Apparatus for Measuring and Recording Capacitance Characteristics, discloses an apparatus wherein the physical characteristics of the variable impedance element may be manually altered depending on the type of grain being tested so that the moisture content of different types of grains may be read from the same scale.

It has, however, been found desirable to devise a moisture tester which has automatic operation and yields direct digital readout of the moisture content. Such a tester should be capable of being converted to measure different types of grain with great ease, of automatically compensating for variations in the temperature of the grain sample, and of automatically balancing its internal circuitry to compensate for changes in component values, such as might occur with age or temperature variation. Further, the tester should be simple to operate and give reliable, highly accurate results over a long period of time.

SUMMARY OF THE INVENTION

This invention generally provides circuitry for measuring the frequency of an input signal and, more particularly, provides circuitry giving an output related to the frequency of an input signal and including means for altering the relationship between the input and output and, still more particularly, provides circuitry for a grain moisture tester that automatically compensates for the physical characteristics of the type of grain under test, the temperature of the tested grain sample, and alterations in the circuit values of the components included within the tester.

It is, thus, an object of this invention to provide a frequency measuring circuit.

It is an object of this invention to provide a frequency measuring circuit wherein the relationship between the circuit output and the input signal frequency may be conveniently altered between a plurality of predetermined characteristics.

It is an object of this invention to provide a moisture tester which may easily be converted to determine the moisture content of a plurality of materials.

It is an object of this invention to provide a moisture tester which automatically compensates for the temperature of the material under test.

It is an object of this invention to provide a grain moisture tester including an automatic balancing circuit which compensates for changes in the circuit parameters of the components included within the tester.

It is an object of this invention to provide a moisture tester operative to determine the frequency of an oscillator including a capacitance comprised in part of the material under test and having a digital readout.

It is an object of this invention to provide a moisture tester which is characterized by ease and reliability of operation, accuracy of results, and simplicity and economy of design and construction.

Further and additional objects will appear from the description, accompanying drawing, and appended claims.

DESCRIPTION OF THE PREFERRED EMBODIMENT

Figure 1:
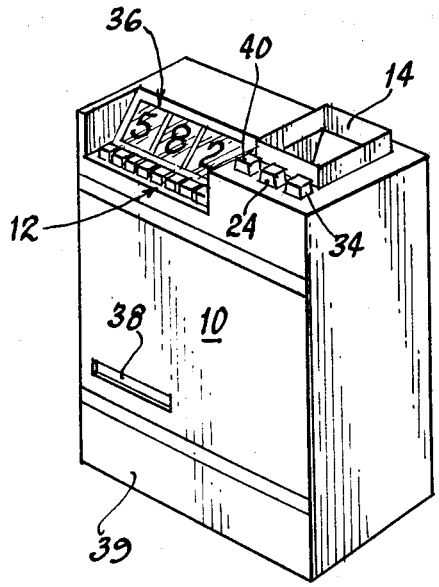
FIG. 1 is a perspective view of a moisture tester including one embodiment of this invention.

In the subsequent description, this invention will be described with relation to a particular digital reading, grain moisture tester and the circuitry therefor. It will be obvious to those skilled in the art, however, that the invention is of much broader application and should not be restricted thereto.

The overall construction and operation of the moisture tester 10 disclosed in the accompanying drawing will first be described. Tester 10 includes a row of buttons 12 disposed on the face thereof. One button is a master power switch controlling the application of power to the tester circuitry and the remaining buttons are capable of selecting various circuit elements within the tester depending upon the type of grain being tested, depression of any one of those buttons corresponding to the testing of a single grain type.

A hopper 14 is disposed within the tester and extends through the top surface thereof to receive the grain sample to be tested. As may be seen from FIG. 2, the hopper is suspended from a bracket 16 fixedly attached to the main body of the moisture tester through a set of parallel bars 18 and springs 20, the suspension system shown being duplicated on the opposite side of the hopper. Bars 18 are capable of pivotal motion with respect to both hopper 14 and bracket 16 and springs 20 are located so as to draw the hopper upward. The hopper and spring system is preloaded and stops restraining its upward and downward travel are provided. When a given weight of material is placed within the hopper, it will swing between the two stops giving a positive indication of the correct weight. The hopper includes doors 22 pivotally mounted to the underside thereof which may be opened or closed as by operation of a button 24 mechanically linked thereto and located on the face of the tester. A similar hopper and scale system is disclosed in more detail in my copending application entitled Sample Scale, Ser. No. 43,770, filed on June 5, 1970.

A grain cell 24 is disposed with the tester and beneath hopper 14. It comprises, in part, a hollow cylindrical, metallic outer electrode 26, shown in section in FIG. 2, and, coaxial therewith, a cylindrical, metallic inner electrode 28 topped by a conically shaped deflection plate 30. Deflection plate 30 insures that the grain sample released from hopper 14 will be relatively uniformly distributed throughout the annular volume between electrodes 26 and 28. The physical relationship between the electrodes is maintained by a structure of electrically insulating material, not shown.

Figure 2:
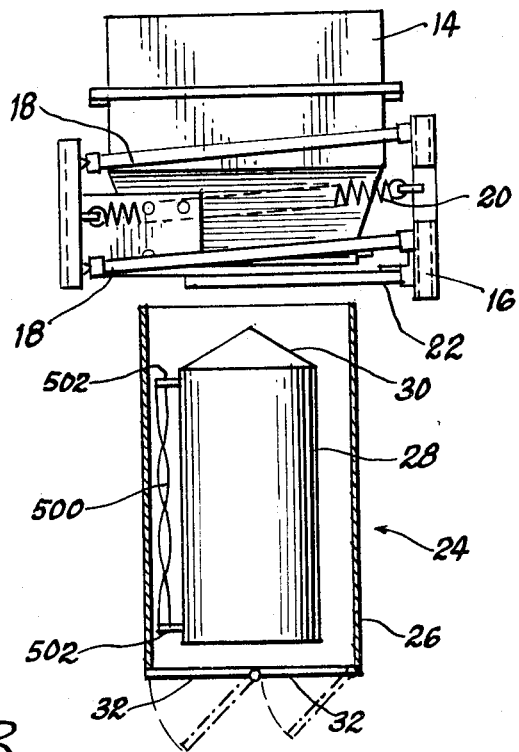
FIG. 2 is a partial, cut away view of the moisture tester of FIG. 1 showing the hopper and scale mechanism, the grain cell, and the grain dump mechanism in schematic form.

Two dump doors 32 are pivotally mounted, and preferably spring loaded, to form the lower wall of the grain cell when in their closed position, as shown schematically in solid lines in FIG. 2. They may be mechanically linked to a button 34 on the face of the tester such that when the button is depressed, doors 32 open, as shown dashed in FIG. 2, and the grain in the cell released into a drawer 38 in the lower section of the tester. Drawer 38 may be removed at the completion of the test and the tested grain disposed of.

The tester 10 additionally includes a digital readout unit 36 located on the face thereof for visually reading the percentage moisture content of the material tested. A digital printing unit may also be included within the tester, a slot 38 being provided on the front of the tester so that a card may be inserted therethrough and into the printer which, when actuated as by depressing a button 40 on the tester face, prints thereon the same figures as appear on digital display unit 36.

Figure 3:
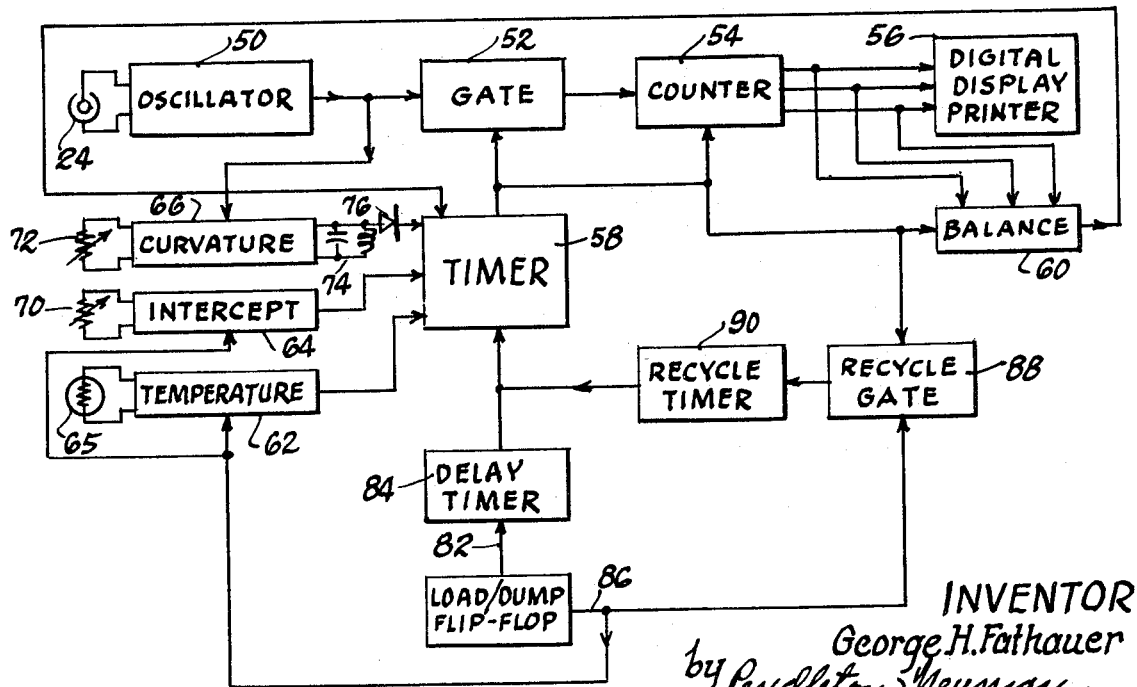
FIG. 3 is a partial block diagram of the circuitry included within the moisture tester of FIG. 1.
Figure 4A:
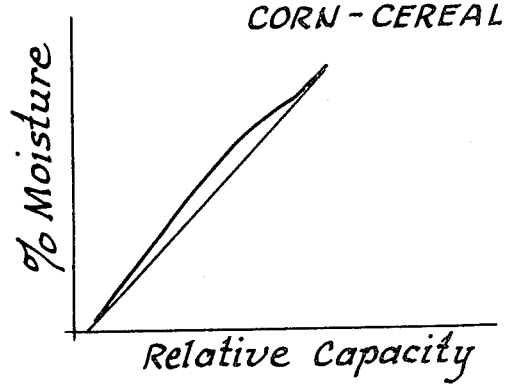
FIGS. 4(a) – 4(e) are graphs showing the relations between moisture content and relative capacity for a plurality of grains.
Figure 4B:
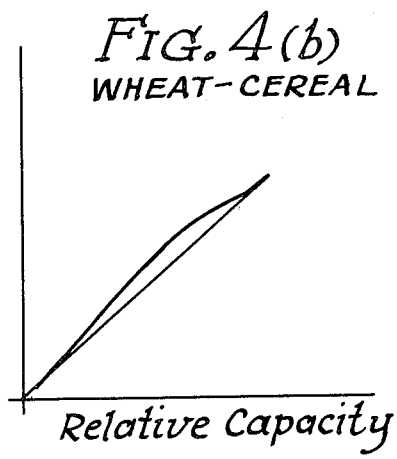
Figure 4C:
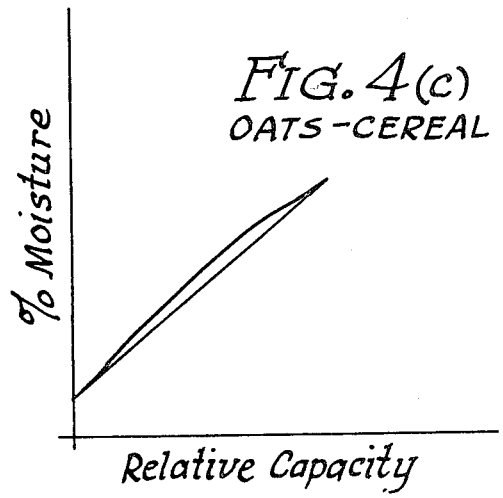
Figure 4D:
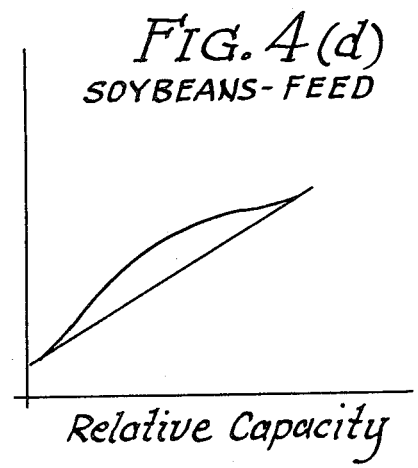
Figure 4E:
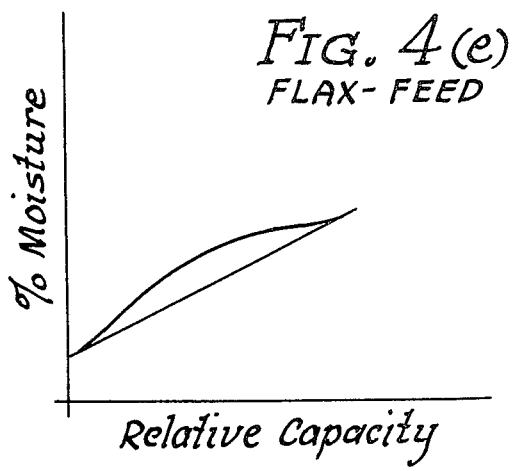

Turning now to the circuitry of this invention, FIG. 3 is a block diagram showing the major elements of the circuit included within the moisture tester of FIG. 1. Specifically, the circuit is comprised in part of an oscillator 50 which includes grain cell 24 used as a capacitive, frequency determining element. The oscillator output is coupled through a signal gate 52 to a digital counter 54 which counts the number of cycles of signal delivered to it from oscillator 50 through gate 52. The counter output, which may be on a plurality of lines, is coupled to the digital display and printing units indicated at block 56. A timer 58 provides at its output pulses of a predetermined, but conveniently variable, period. Those timer pulses are applied to, first, a reset input to counter 54 to set an initial, reference count on the counter at the pulse onset, and, second, to a control input of gate 52. The signal from oscillator 50 is, thus, applied to counter 54 only for the duration of the pulses from timer 58. If the duration of those timer pulses and the operating characteristics of oscillator 50 are known, the resultant count displayed on unit 56 may be used to determine the oscillator output frequency, the cell capacitance, the dielectric constant of the grain within the cell, and the moisture content of that grain.

FIGS. 4(a) – 4(e) show the relationship between percentage moisture content and relative capacity for five grains, corn, wheat, oats, soybeans, and flax, respectively, at a constant temperature. The absolute value of the capacitance represented on the horizontal scale will, of course, vary with the physical configuration of the cell used. Also shown in FIGS. 4(a)–4(e) are a set of five straight lines, one for each grain represented, and drawn through the extremities of the curves for the corresponding grains; they may be considered as linear approximations to their associated curves. Each of the curves of FIGS. 4(a)–4(e) may be conveniently visualized as the sum of two functions, one being represented by the associated straight line and the other by the difference between the actual curve and its associated straight line. The following four observations concerning the representations of FIG. 4 may usefully be made.

1. For the values plotted the difference function is always positive, indicating that the curves shown are always bowed upward.
2. For the grains represented, the difference functions all have a similar shape and have a maximum value occurring at approximately the same value of relative capacity, though the maximum values differ widely.
3. The grains represented in FIGS. 4(a)–4(e) may be divided into two groups, the cereal grains, corn, wheat and oats, and the feed grains, soybeans and flax; the slopes of the linear approximations for the feed grains are approximately the same and the slopes of the linear approximations for the cereal grains are approximately the same, the cereal grains having a relatively greater slope than the feed grains.
4. The maximum values of the difference functions for the feed grains are relatively greater than the maximum values of the difference functions for the cereal grains.

Making use of the first three of the above approximations, it may then be seen that once the shape of the difference function and the location of its maximum are known, any one of the grain curves of FIGS. 4(a)–4(e) may be specified to a good approximation by giving three parameters, the vertical intercept of its linear approximation, the maximum value of its difference function, and the nature of the grain as cereal or feed, the last parameter indicating the slope of the linear approximation. As will become apparent subsequently, the described moisture tester of this invention makes use of just such a specification. The universal resonance curve is used as an approximation of the difference function.

As is well known, variations in temperature in any given grain type result in a substantial vertical displacement in the curves of FIG. 4. The relation between displacement and temperature is approximately linear and the same for all types of grains commonly encountered. Means for effecting that vertical displacement are included in the moisture tester of this invention.

Returning then to the discussion of FIG. 3, as above noted, if the duration of the pulses from timer 58 is fixed, there will be a simple relationship between the count obtained on counter 54 at the end of each timer pulse, the frequency of oscillator 50, the capacity of cell 24, and the moisture content of the grain within the cell. That relationship will be approximately linear since cell capacity and oscillator frequency as well as the grain moisture content and dielectric constant are related approximately parabolically. Changing the duration of those timer pulses will alter that relationship. By properly adjusting the duration of the timer pulses, the relationship between the frequency of operation of oscillator 50 and the count obtained by counter 54 can be adjusted so that the relationship between the obtained count and the grain moisture content is the same, no matter what the grain being tested or its temperature. Further, the digital display and printer can be made to give a direct reading of moisture content. Four separate circuits are provided in FIG. 3 to vary the length of the pulses produced at the output of timer 58, a balance circuit 60 which compensates for any variations in the circuit parameters from their desired value, a temperature circuit 62, an intercept circuit 64, and a curvature circuit 66. Although not shown in FIG. 3 for simplicity of explanation, circuitry may also be supplied for effecting those changes required by the observed differences between cereal and feed grains.

Balance circuit 60 is used to establish an initial operating reference condition for the tester circuit. It is coupled to the output of counter 54 and its operation is controlled by the output of timer 58. The balance circuit produces at its output a signal indicative of whether the count achieved at counter 54 at the end of each timer pulse is above or below a certain predetermined, fixed number. When that output signal is appropriately applied to timer 58, as shown in FIG. 3, a feedback loop is established adjusting the pulse time of timer 58 so that the counter 54 will achieve the fixed count set into the balance circuit. The balance circuit is rendered operative only when there is no grain contained within cell 24.

Temperature circuit 62 varies the period of timer 58 in accord with the temperature of the grain being measured. It includes a thermistor 68 physically located within grain cell 24 and in contact with the grain under test. The variation in resistance of the thermistor is used to produce an output signal indicative of the grain temperature which is applied to timer 58. As will be apparent, temperature circuit 62 must be disabled when balance circuit 60 is operative so that it will not affect the establishment of the tester initial operating condition.

Intercept circuit 64 has an output which varies the period of timer 58 effectively in accord with the vertical location of the moisture curve of the particular grain under test. That variation is effected by selecting the proper resistance for an element in the circuit 64, indicated schematically by variable resistance 70 in FIG. 3. As with temperature circuit 62, intercept circuit 64 must be disabled when the balance circuit is operative.

Finally, curvature circuit 66 varies the period of timer 58 in accord with relative capacity of the cell 24. An output of oscillator 50 is coupled to curvature circuit 66 which provides at an output an a.c. signal of constant current amplitude regardless of the frequency of operation of oscillator 50. The constant amplitude a.c. signal is applied to a parallel resonant circuit 74 tuned to the frequency at which oscillator 50 will operate when the capacity of cell 24 is that at which the actual grain moisture content has its maximum deviation from the straight line approximation. An a.c. voltage is thus developed across the resonant circuit related through the universal resonance curve to the a.c. current through the circuit. That a.c. voltage is rectified by a diode 76, and subsequently filtered to provide a d.c. signal which is an analog to the departure of the actual grain curve from its straight line approximation. That d.c. signal is used to vary the duration of the timer pulse. A variable resistance element, indicated schematically at 72, is included in circuit 66 to adjust the magnitude of the constant current a.c. signal in accord with the maximum deviation of the grain under test. No circuitry has been found necessary to disable the curvature circuit during operation of balance circuit 60. The curvature circuit will produce only a very low level output signal at the reference operating condition of the tester because of the difference between the operating frequency of oscillator 50 and the resonant frequency of network 74.

It will be observed from the above discussion that the intercept and temperature corrections are made by varying the period of the timer for a fixed period. In order for such a variation to have a known, fixed effect on the output of the tester, it must be assumed that the oscillator 50 is operating at a constant frequency. That assumption is, of course, in error as the fundamental operational principle of the tester is to measure a change in the frequency of oscillation. However, the relative changes in oscillation frequency may be made quite small relative to the actual frequency. The assumption is then approximately correct.

The block diagram of FIG. 3 also includes control circuitry for controlling the operation of the tester. Load/Dump flip-flop 80 is a conventional set/reset flip-flop actuated by switches mechanically coupled to buttons 24 and 34 on the front panel. When button 24 is depressed loading the grain into the cell, flip-flop 80 changes to a first state and a flip-flop output 82 similarly changes condition. That condition change is propogated through a delay timer 84 to timer 58 causing timer 58 to emit a timer pulse and operating the tester.

After the test is completed and the reading taken, button 34 is depressed and the grain is dumped from the cell. Further, load/dump flip-flop changes to a second state and a second output 86 of flip-flop 80 then changes condition and activates a recycle gate 88. Activation of the recycle gate 88 has two effects, it pulses timer 58 through a recycle timer 90 causing timer 58 to emit another pulse of predetermined period and it holds recycle gate 88 open until flip-flop 80 again changes state. The output of timer 58 is coupled to an input of recycle gate 88. When recycle gate 88 is open, it receives the output pulses from timer 58 and, after a given period of delay provided by the recycle timer 90, reactivates timer 58. Thus, as long as flip-flop 80 remains in its second state, the tester will be continually activated and will achieve a balance condition. The placing of load/dump flip-flop 80 in the second or dump state also disables the temperature circuit 62 and intercept circuit 64. Placing the flip-flop 80 in the first or load state must, of course, disable the balance circuit. The delay timer 84 allows the thermistor sufficient time to come to the temperature of the grain under test before the measurement is made. Thus when button 24 is activated, flip-flop 80 is placed in its load state and the tester is put into a read mode; when button 34 is activated, flip-flop 80 is placed in its dump state and the tester is put into a balance mode.

Figure 5:
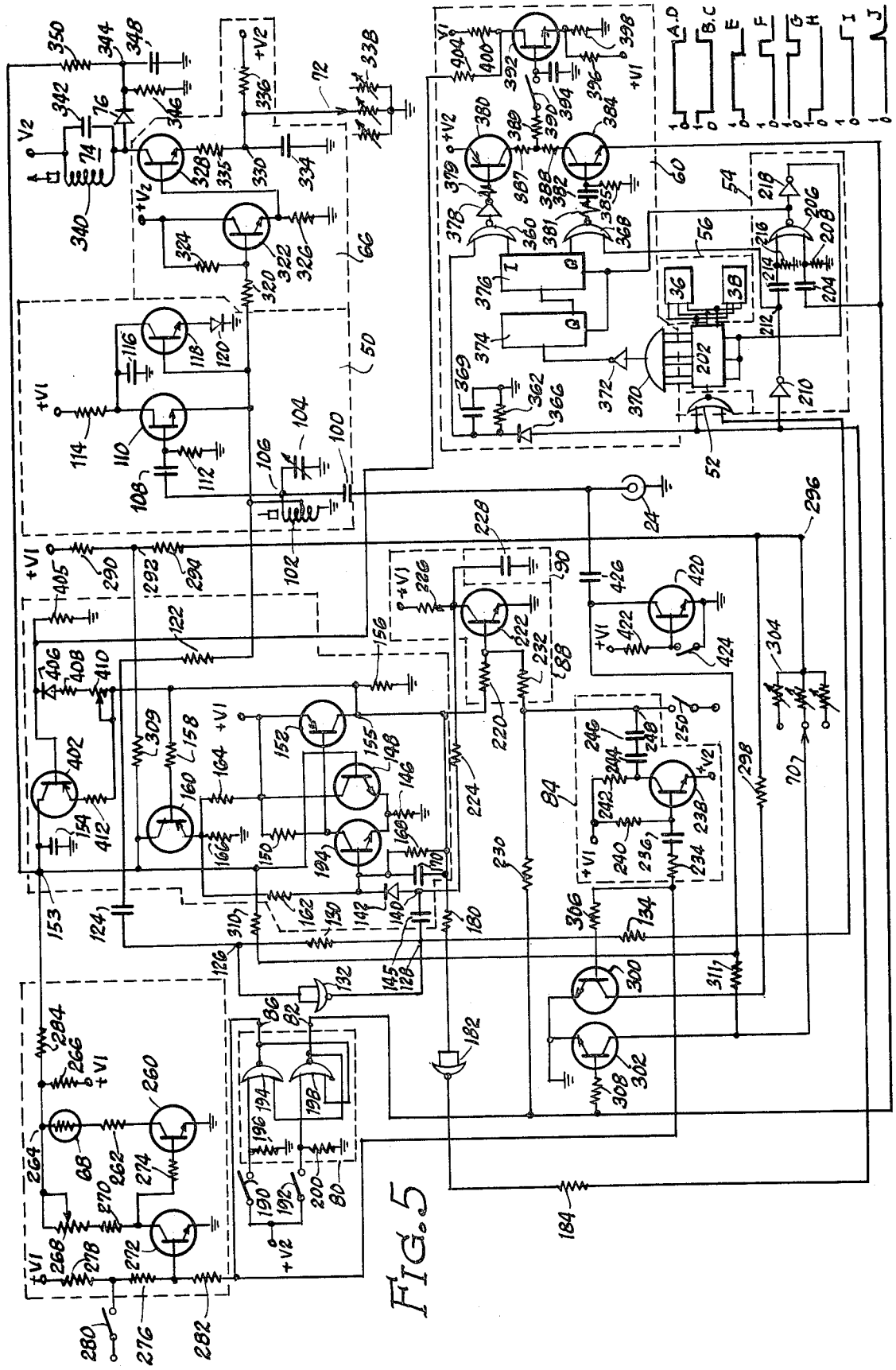
FIG. 5 is a schematic diagram of the circuitry included within the moisture tester of FIG. 1.

A schematic diagram of a circuit including one embodiment of the present invention is shown in FIG. 5. Oscillator 50 is basically a Hartley oscillator with grain cell 24 included as a capacitive element in the resonant circuit thereof. Specifically, the series combination of grain cell 24 and a capacitor 100 are coupled in parallel with a slug tuned inductor 102 and a trimmer capacitor 104 between a circuit point 106 and a common ground. Circuit point 106 is connected through a blocking capacitor 108 to the gate element of a P type field effect transistor 110 which is, in turn, coupled to ground through a bias resistor 112. The source element of transistor 110 is connected to a tap on inductor 102 and the drain is connected through load resistor 114 to a first source of positive voltage V1, through a filter capacitor 116 to ground, and to the collector of an NPN transistor 118. Transistor 118 has its emitter coupled through a diode 120 to ground, the diode being oriented for high positive current conduction toward ground, and its base connected to the source element of transistor 110. Transistor 118 is used as a shunt regulator across transistor 110 for maintaining the amplitude of the oscillator output constant regardless of variations in the grain cell impedance, variations in the oscillator circuit parameters, such as are brought about by aging, or variations in loading on the supply source V1. In one apparatus constructed embodying the present invention, it was found convenient to choose the circuit constants of oscillator 50 such that it would operate at 2 MHertz with no grain in cell 24.

The output of oscillator 50 is taken from the tap on inductor 102 and applied through the series combination of a resistor 122 and a capacitor 124 to a circuit point 126 which is, in turn, coupled to a circuit point 128 through a resistor 130. A conventional, two input logical NOR gate 132 is included with both its inputs connected to circuit point 126 and its output connected to circuit point 128. The description of gate 132 and all other elements subsequently described by their logical function assumes a convention wherein a positive voltage level represents a logic level 1 and a ground level voltage represents a logic level 0. The gate 132 serves to amplify the output of oscillator 50 and convert its sine wave output to a pulse type waveform for use by counter 54. That pulse waveform is coupled from circuit point 128 through a resistor 134 to a first input of another conventional, two input logical NOR gate used as the gate 52 of FIG. 3.

Timer 58 is, basically, a monostable multivibrator including means for varying its period of operation. The trigger input to the timer is at a circuit point 140. That point is coupled both through a diode 142, oriented for high positive current conduction away from circuit point 140, to the base of an NPN transistor 144 and through a capacitor 145 to circuit point 128. The emitter of transistor 144 is coupled both through a resistor 146 to ground and directly to the emitter of another NPN transistor 148. The collector of transistor 144 is coupled both to first positive supply source V1 through a resistor 150 and to the base of a PNP transistor 152, while the collector of transistor 148 is coupled directly to first positive supply source V1. The base of transistor 148 is coupled to circuit point 153 and that circuit point is coupled to ground through a capacitor 154. The collector of transistor 152 is coupled to a circuit point 155 and the emitter is connected to first positive supply source V1. Circuit point 155 is coupled both through a resistor 156 to ground and through a resistor 158 to the base of a PNP transistor 160 having its collector connected to circuit point 153 and its emitter coupled to the base of transistor 144 through a resistor 162, to first positive supply source V1 through a resistor 164, and to ground through a resistor 166. The output of multivibrator 58 is taken from circuit point 155. That circuit point is coupled through a parallel combination of a resistor 168 and a capacitor 170 to the base of transistor 144.

Capacitor 154 is used as the period determining element of timer 58. The emitter of transistor 160 is normally held at a fixed, positive voltage by the potential divider of resistors 164 and 166. The timer output at circuit point 157 is, in this described embodiment, normally at ground level with positive going pulses emitted when the timer is actuated. Thus, transistor 160 is normally conductive and circuit point 153 is normally held at the bias potential present on the emitter of transistor 160. Resistors 162 and 168 are used as an additional voltage divider between the potentials at the emitter of transistor 160 and output circuit point 155 to normally bias the base of transistor 144 at a low level. The positive potential at circuit point 153 tends to make transistor 148 highly conductive, thus developing a positive signal at the emitter of transistor 144 tending to turn it off. Additionally, when transistor 144 is in its normal state, its collector is at a high positive voltage and transistor 152 is cut off.

When a positive trigger pulse of sufficient amplitude is applied to input circuit point 140, the base of transistor 144 is driven sufficiently positive to cause that transistor to become highly conductive, lowering the voltage on its collector and causing transistor 152 to become highly conductive thus raising the potential at output circuit point 155 to approximately that present at first supply source V1. That increase in potential is effective through the divider of resistors 162 and 168 to hold the base of transistor 144 sufficiently positive that the transistor is held in its highly conductive state. Conduction through transistor 144 also raises the voltage across resistor 146 making transistor 148 relatively nonconductive.

However, the increase in potential at output circuit point 155 is also sufficient to cause transistor 160 to assume a relatively nonconductive state. Capacitor 154 is then allowed to charge upwardly at a rate dependent on the magnitude of the d.c. currents applied to it. When the charge on capacitor 154 reaches a sufficient level that the voltage across it causes the base of transistor 148 to again be forward biased, that transistor then becomes highly conductive. A positive voltage equal approximately to that of the supply source V1 is thus placed on the emitter of transistor 144 making it relatively less conductive, thus also making transistor 152 relatively less conductive and returning circuit point 155 to approximately ground potential.

It is thus apparent that by varying the rate at which capacitor 154 is charged, the duration of the positive voltage pulse appearing at output circuit point 155 may be changed. In the described circuit, capacitor 154 is charged by signal currents applied to it from balance circuit 60, temperature circuit 62, intercept circuit 64, and curvature circuit 66. In an apparatus including the present invention with oscillator 50 operating nominally at 2 MHertz, it was found convenient to choose the circuit constants of timer 58 such that its output pulses were approximately 1 millisecond long when no signals were applied from circuits 60, 62, 64 or 66. The timer circuit parameters may usefully be chosen to require that an output pulse from oscillator 50 be present at circuit point 140 to trigger the timer. The timer operation may thus be synchronized with that of the oscillator.

The timer output circuit point 155 is coupled through a resistor 180 to the two inputs of a conventional two input logical NOR gate 182, here used as an inverting signal amplifier, which, in turn, has its output coupled through a resistor 184 to a second input of gate 52. The positive going pulses at output circuit point 155 are thus converted to negative going pulses and used to control the operation of gate 52. NOR gate 52 is enabled by the inverted timer output during the timer pulses and used to gate only those pulses generated by oscillator 50 occurring during the length of the output pulses from timer 58 to counter 56.

Load/dump flip-flop 80 is actuated by a normally open load switch 190 mechanically connected to button 24 on the tester face and by a normally open dump switch 192 mechanically connected to button 34 on the tester front panel. Load switch 190 couples a second positive voltage source V2, second source V2 being of lesser magnitude than first source V1, to a first input of a conventional two input NOR gate 194 within flip-flop 80, that input also being coupled to ground through a resistor 196. Dump switch 192 couples the second positive source V2 to a first input of a conventional two input NOR gate 198, that input also being coupled to ground through a resistor 200. The output of gate 194 is connected to flip-flop output 86 and to a second input of gate 198, while the output of gate 198 is connected to flip-flop output 82 and to a second input of gate 194. Thus when load switch 190 is momentarily actuated, output 82 goes to a positive voltage and output 86 goes to ground. However, when dump switch 190 is momentarily actuated, output 86 goes to a positive voltage and output 82 goes to ground.

Counter 202 is a conventional digital counter, having both binary coded decimal and decimal outputs, with its signal input coupled to the output of NOR gate 52. If oscillator 50 is operative at approximately 2 MHertz and timer 58 produces pulses of approximately 1 millisecond duration, approximately 2,000 pulses will be applied to counter 202 during one timer pulse. Further, any addition of grain to cell 24 will increase its capacity and, thus, lower the frequency of oscillator 50 and the number of oscillator pulses delivered to timer 50 during a single gating pulse. The maximum count counter 202 need be capable of is, then, approximately 2,000. However, in operation of the circuit using these time parameters, it has been found that the maximum change in frequency of oscillator 50 is approximately 10 percent. The thousands digit of the count thus is relatively insignificant and only the last three significant figures need be retained by counter 202. A digital counter having a maximum decimal count of 999 may, therefore, be used for counter 202.

The decimal outputs of counter 202 are connected in parallel to digital display unit 36 and digital printout unit 38. As will be apparent from FIG. 4, an increase in the moisture content of any particular type of grain under test will increase the capacity of the grain cell 24, decrease the frequency of oscillator 50, and decrease the count achieved in counter 202 during a single timer pulse. Thus, in order for digital readout 36 to give a direct reading of grain moisture content, the displayed count must increase with a decrease in the count achieved on counter 202. Readout 36 and printer 38 are, therefore, such as to display the nines compliment of the count present in counter 202. They effectively show between timer pulses the last three significant digits of the quantity 2,000 minus the number of oscillator pulses occurring during the previous timer pulse.

The output 82 of load/dump flip-flop 80 is coupled through a capacitor 204 to a first input of a conventional, two input logical NOR gate 206, that first input also being coupled to ground through a resistor 208. Additionally, the inverted output of timer 58 is taken from the second input of gate 52 and applied through an inverting amplifier 210 to a circuit point 212. That circuit point is coupled through a capacitor 214 to a second input of NOR gate 206, the second input being additionally coupled to ground through a resistor 216. An inverting amplifier 218 has its input connected to the output of NOR gate 206 and its output connected to the reset inputs of counter 202. Those reset inputs are operative upon application of a positive voltage pulse to return the count on counter 202 to 999, giving a reading of zero on readout unit 36.

It is apparent that the series combination of NOR gate 206 and inverter 218 form a logical OR gate. When the output of timer 58 goes positive, indicating the onset of a timer period, the positive going level change is applied, through inverters 182 and 210, to circuit point 212. Capacitor 214 and resistor 216 differentiate the positive level change applying a short duration positive pulse, indicative of a logic level 1, to gate 206 causing a positive pulse of similar duration to be applied to the reset inputs of counter 202, thus preparing the counter to receive the pulses from oscillator 50 for the following timer period. Similarly, when load switch 190 is actuated, the resultant positive going level change at output 82 from load/dump flip-flop 80 is applied through the differentiating network of capacitor 204 and resistor 208 to gate 206 resulting in the application of a short duration positive pulse to the reset inputs of counter 202. This arrangement has the advantage that a count of zero is displayed on digital readout 36 during the delay introduced by delay timer 84.

The output of timer 58 at circuit point 155 is coupled through a resistor 220 in recycle gate 88 to the base of an NPN transistor 222. The emitter of that transistor is coupled to input circuit point 140 in timer 58 through a resistor 224, to first positive voltage supply V2 through resistor 226, and to ground through a capacitor 228 used as recycle timer 90. Thus while the output of timer 58 is positive, i.e., during an output pulse, transistor 220 is conductive and the capacitor 228 discharges through it. But when the pulse terminates, no positive signal is applied from timer 58 to transistor 222 and it becomes nonconductive. Capacitor 228 then charges through resistor 226 until the voltage across it reaches a sufficient level to trigger timer 58. Thus recycle gate 88 and recycle timer 90 will retrigger the timer 58 at the end of a predetermined period following the termination of a timer output pulse, the length of that period being determined primarily by the relative values of resistor 226 and capacitor 228.

In order to trigger timer 58 when grain is placed into grain cell 24, output 82 of load/dump flip-flop 80 is coupled through the series combination of resistors 230 and 232 to the base of transistor 222. However, delay timer 84 is provided to delay the actuation of the timer until thermister 68 has reached the temperature of the grain. Output 86 of load/dump flip-flop 80 is connected to a resistor 234 in delay timer 84 which is, in turn, coupled through a capacitor 236 to the base of an NPN transistor 238. The emitter of transistor 238 is coupled directly to second positive voltage supply V2 while the base and emitter of transistor 214 are coupled through resistors 240 and 242, respectively, to first positive voltage supply V1. The collector of transistor 238 is also coupled through the series combination of two capacitors 244 and 246 to an output circuit point 238. That circuit point is coupled to ground through a normally open switch 250 and to the junction of resistors 230 and 232.

Transistor 238 is normally self biased to a conductive state, the voltage at source V2 being less than that at source V1. While in its dump state, a zero volt output signal appears at output 82 of load/dump flip-flop 80. However, when load switch 190 is actuated, load/dump flip-flop output 82 is driven positive which initially tends to hold the base of transistor 222 positive, thus defeating the action of the recycle gate by not allowing capacitor 228 to recharge at the termination of a timer output pulse. Further, when load switch 190 is actuated, load/dump flip-flop output 86 goes to ground level which, because of capacitor 236, generates a negative going pulse at the base of transistor 238 causing it to become nonconductive. The values of capacitor 236 and resistor 240 are chosen so that the negative going pulse holds transistor 238 in a nonconductive state for a relatively long period, for example, ten seconds. The voltage on the collector of that transistor then increases toward the voltage of source V1 and a positive pulse appears at the output circuit point 248. However, after the negative going pulse at the base of transistor 238 decays sufficiently, the transistor becomes conductive and the voltage at its collector drops from that of the first positive supply voltage V1 to that of the second positive supply voltage V2, creating a negative going pulse at output circuit point 248. That negative going pulse is applied to the base of transistor 222 and is of sufficient duration, determined by properly choosing the values of resistor 242 and capacitors 244 and 246, to allow capacitor 228 to recharge applying a positive voltage to circuit point 140 of sufficient level to cause timer 58 to be operated. It will be apparent that the actual connections between load/dump flip-flop 80, delay timer 84, recycle gate 88, and recycle timer 90, as shown in FIG. 5, are slightly different from those shown in FIG. 3. However, the circuit of FIG. 5 achieves the logical result of FIG. 3.

Temperature correcting circuit 62 includes an NPN transistor 260 having its emitter connected to ground and its collector coupled through the series combination of a resistor 262 and thermistor 68 to a circuit point 264. Circuit point 264 is coupled to the first positive supply source V1 through a resistor 266 and through the series combination of variable resistor 268 and a fixed resistor 270 to the collector of an NPN transistor 272. The emitter of transistor 272 is connected to ground while the collector is additionally coupled through a resistor 274 to the base of transistor 260. The base of transistor 272 is connected to the first positive source through the series combination of resistors 276 and 278, the junction of those resistors being connected to ground through a normally closed switch 280. Output 86 of load/dump flip-flop 80 is coupled through a resistor 282 to the base of transistor 272. The circuit point 264 is coupled through a resistor 284 to circuit point 153 in timer 58.

When transistor 272 is made conductive by applying a positive voltage to its base, as by actuating dump switch 192, transistor 260 is rendered relatively nonconductive and the voltage present at circuit point 264 is dependent primarily on the voltage divider effect of resistors 266, 268 and 270. When transistor 272 is made relatively nonconductive by applying a ground level voltage to its base, as by actuating load switch 190, transistor 260 is made conductive and the voltage present at circuit point 264 is dependent primarily on the voltage divider effect of resistors 262 and 266 and thermistor 68. The voltage at circuit point 264 is, then, dependent on the temperature of the thermistor in the grain cell. Variable resistor 268 is adjusted so that the total resistance of resistors 268 and 270 is approximately equal to the total resistance of resistor 262 and thermistor 68 at some arbitrary reference temperature, say 20°C. Thus when load switch 190 is actuated, the voltage at circuit point 264 will change, either increasing or decreasing, and a current will flow through resistor 284 tending to either charge or discharge capacitor 154 in timer 58, depending on the direction and magnitude of the grain temperature deviation from the reference temperature.

The intercept correction circuit 64 includes a resistor 290 connected from the first positive supply source V1 to a circuit point 292 which is, in turn, coupled through a resistor 294 to a circuit point 296. A resistor 298 connects circuit point 296 to the collector of an NPN transistor 300 having its emitter coupled to ground. Circuit point 296 is also coupled to the collector of an NPN transistor 302 through one of a plurality of variable resistors, indicated at 304, switchably selected by switch 70. Switch 70 is a schematic representation of a portion of the switches connected to the buttons 12 on the tester front panel which select the desired circuit constants for the particular grain to be tested. A different resistor is selected for each type of grain; only three resistors are shown for economy of drawing. The emitter of transistor 302 is connected to ground. The base of transistor 300 is coupled through a resistor 306 to output 86 of load/dump flip-flop 80 while the base of transistor 302 is coupled through a resistor 308 to output 82. Finally, circuit point 153 is coupled both to circuit point 292 through a resistor 309 and to the collector of transistor 302 through the series combination of a resistor 310 and a resistor 311.

When flip-flop 80 is in the dump state, a positive voltage is applied to the base of transistor 300 making it conductive while a ground level voltage is applied to the base of transistor 302 making it nonconductive. The voltage divider formed by resistors 290, 294 and 298 then establishes a fixed voltage at circuit point 292, causing a current to flow through resistor 309 to circuit point 153. However, when flip-flop 80 is placed in the load state, transistor 300 becomes nonconductive and transistor 302 becomes conductive. A voltage divider is then formed by resistors 290, 294 and the selected one of resistors 304 establishing another relatively fixed voltage at circuit point 292, that voltage depending on which of the resistors 304 is selected, and causing a current to flow through resistor 309 tending to charge or discharge capacitor 154 depending upon its rate and direction of flow. The resistance of the series combination of resistors 310 and 311 is relatively large compared with the other resistances in the intercept circuit so they have little effect on its operation.

The curvature correction circuit 66 is driven by the output of oscillator 50 which is coupled through a resistor 320 to the base of an NPN transistor 322. That base is also coupled through a bias resistor 324 to the second supply source V2, while the collector of transistor 322 is coupled directly to that potential source. The emitter of transistor 322 is coupled both to ground through a resistor 326 and to the base of an NPN transistor 328. The emitter of transistor 328 is coupled, in turn, to circuit point 330 through resistor 332 and to ground through bypass capacitor 334. Circuit point 330 is connected to a voltage dividing network including a resistor 336 coupled to supply source V2 and one of a series of variable resistors, indicated at 338 and switchably selected by switch 72, coupled to ground. Switch 72 is a schematic representation of a portion of those buttons 12 on the front panel of the tester which select the desired circuit constants for the particular grain to be tested. A different resistor 338 is selected for each type of grain; only three resistors 338 are shown for economy of drawing.

The collector of transistor 328 is coupled through tuned circuit 74 to positive supply source V2. Tuned circuit 74 comprises the parallel combination of a slug tuned inductor 340 and a capacitor 342. The collector of transistor 328 is also coupled through diode 76 to a circuit point 344, the diode being oriented for high positive current flow toward circuit point 344. That point is coupled both to ground through the parallel combination of a resistor 346 and a filter capacitor 348 and to circuit point 153 in timer 58 through a resistor 350.

Transistors 322 and 328 and their associated components amplify the output of oscillator 50 and drive tuned circuit 74. The amplitude of the drive signal may be varied by selecting the appropriate one of resistors 338. In one embodiment of this invention having an oscillator 50 nominally operating at 2 MHertz, circuit 74 was constructed to have a resonant frequency of 1.9 MHertz.

Balance circuit 60 includes a conventional two input NOR gate 360 which has a first input coupled to ground through the parallel combination of a resistor 362 and a capacitor 364. The inverted output of timer 58 is taken from the second input of gate 52 and applied through a diode 366 to that first input of gate 360, diode 366 being oriented for high positive current conduction toward the first input of gate 360. The balance circuit also includes another conventional, two input NOR gate 368 having a first input connected to circuit point 212 in counter 54. A plurality of outputs from counter 202 are tied to inputs of a conventional, multi-input AND gate 370. The counter outputs are those representing approximately one-half the number of pulses from oscillator 50 occurring during a single output pulse from timer 58. If the nominal timer period is such as to include approximately 2,000 pulses from oscillator 50, the binary outputs of counter 202 which, when simultaneously properly actuated, are representative of a count of 999 are connected to the inputs of AND gate 370. Gate 370 will thus emit a pulse of logic level 1 as the count on counter 202 passes through 999. The output of gate 370 is coupled through an inverter 372 to the complimenting input of a conventional, set/reset flip-flop 374. The Q output of flip-flop 374 is then coupled to the complimenting input of another conventional, set/reset flip-flop 376. Flip-flops 374 and 376 are such that in the set state the Q outputs are at logic level 0 and the I outputs are at logic level 1 and in the reset state the Q outputs are at logic level 1 and the I outputs at logic level 0. Further, a negative going pulse applied to the complimenting input causes them to change states, while a negative going pulse applied to the reset input causes them to assume the reset state. The I and Q outputs of flip-flop 376 are connected to the second inputs of gate 360 and 368, respectively. The reset inputs of flip-flops 374 and 376 are coupled to the output of gate 206 in counter 54.

The output of gate 360 is coupled through an inverting amplifier 378 and a resistor 379 to the base of a PNP transistor 380 having an emitter coupled to second supply source V2. The output of gate 368 is connected to the series combination of a resistor 381 and a capacitor 382 and then both directly to the base of an NPN transistor 384 and through resistor 386 to ground. The emitter of transistor 384 is connected to output 82 of load/dump flip-flop 80. The collectors of transistor 380 and 384 are tied together through the series connection of resistors 387 and 388, the junction of those resistors being coupled through the series combination of a resistor 389 and a normally closed switch 390 to the gate element of a P type field effect transistor 392. The gate element of that transistor is also coupled to ground through a capacitor 394 while the source element is coupled to first positive supply V1 through a resistor 396 and to ground through a resistor 398. The drain element of transistor 392 is coupled to first positive supply V1 through a resistor 400 and to the base of an NPN transistor 402 in timer 58 through a resistor 404. The base of transistor 402 is additionally coupled to ground through a resistor 405 and to the emitter of that same transistor through the series combination of a diode 406, a resistor 408, a variable resistor 410 and a resistor 412, diode 406 being oriented for high positive current conductivity toward the base of transistor 402. The junction of variable resistor 410 and resistor 412 is connected to timer output circuit point 155. The collector of transistor 402 is connected to circuit point 153.

When the circuit 60 is operative and the tester is in a balanced condition, the pulses at the output of timer 58 will be of a duration to encompass 2,000 pulses generated by oscillator 50. The count on counter 202 will, thus, go through 999 three times during each timer pulse, first when the counter is set to that figure by application of an appropriate signal from the output of gate 206 at the onset of the timer pulse, second on application of the 1,000th pulse from oscillator 50 through gate 52, and third on application of the 2,000th pulse from oscillator 50 through gate 52. As the counter passes through 999, a positive voltage, logic level 1, pulse will be emitted from the output of gate 370 and applied through inverter 372 as a zero voltage, logic level 0, pulse to flip-flop 374.

Flip-flops 374 and 376 will be placed in their reset state by a pulse from gate 206 at the onset of each timer pulse. The first pulse from gate 370 will place flip-flop 374 in its set state changing the level at its Q output from a positive voltage, logic level 1, to a zero voltage, logic level 0. That level change in turn places flip-flop 376 in its set state, changing the logic level at its I output from 0 to 1 and at its Q output from 1 to 0. The second pulse from gate 370 will reset flip-flop 374 with no effect on flip-flop 376. The third pulse from gate 370 will again set flip-flop 374 and reset flip-flop 376, causing the I output of flip-flop 376 to go from logic level 1 to logic level 0 and the Q output from logic level 0 to logic level 1. Thus, when the tester is balanced, the I output of flip-flop 376 is normally at logic level 0 with positive going pulses to logic level 1 coincident with the timer pulses, as shown at A in FIG. 3. The I output is combined with the inverted timer pulses which are normally of logic level 1 with negative going pulses to logic level 0, shown at B, in NOR gate 360. The output of NOR gate 360 will, thus, be constant at logic level 0. (Some spurious, positive going, logic level 1 pulses may be included in the output of gate 360 due to the differences in propagation times through the different portions of the circuit. The network of resistor 362, capacitor 364, and diode 366 introduces a slight propagation delay to help eliminate those pulses. Such spurious pulses would be of very short duration and have no effect on the operation of the subsequent circuitry.) Further, with the tester balanced, the Q output of flip-flop 376 is normally at logic level 1 with negative going pulses to logic level 0, coincident with the timer pulses, shown at C. The Q output is combined when the timer pulses which are normally at logic level 0 with positive going pulses to logic level 1, shown at D, in NOR gate 368. The output of NOR gate 368 will, thus, also be constant at logic level 0. (As with gate 360, some spurious logic level 1 pulses may be included in the output, but their presence is of no effect.)

However, when the tester is out of balance, a different set of signals will be present. When the timer period is too long, which may alternately be visualized as the frequency of oscillator 50 being too low, the timer period will exceed the time required for 2,000 pulses to be applied to counter 202. Thus the 1 level pulse present at the I output of flip-flop 376 and applied to the second input of NOR gate 360, shown at E, will be of shorter duration than the inverted timer, 0 level, pulse applied to the first gate input. A positive going, 1 level pulse will then be developed at the output of NOR gate 360 of a period equal to the excess length of the timer pulse, as shown at F. That pulse is inverted by inverter 378 and applied as a negative going pulse to the base of transistor 380, as shown at G. When the timer period is too short, which may alternatively be visualized as the frequency of the oscillator 50 being too high, the timer period will not be sufficiently long to allow 2,000 pulses to be applied to counter 202 before gate 52 is disabled at the cessation of the timer pulse. A number of pulses fewer than 2,000 will be applied to the counter 202, gate 370 will emit only two pulses during a timer period, and flip-flop 376 will not return to its reset state. Thus, the 0 level pulse present at the Q output of flip-flop 376 and applied to the second input of NOR gate will not terminate at the end of the timer, 1 level pulse applied to the first gate input, as shown at H. The output of NOR gate 368 will then change in a positive direction from logic level 0 to logic level 1 at the end of the timer period, as shown at I. That positive voltage step will be applied through the network of resistor 381, capacitor 382 and resistor 386, as a positive going pulse, indicated as J, to the base of transistor 386.

Therefore, in summary, when the timer period is too long, a negative going pulse is applied to the base of transistor 380 at the end of each timer period, but when the timer period is too short, a positive going pulse is applied to the base of transistor 384 at the end of each timer period.

When load switch 190 is actuated, a positive signal is applied to the emitter of transistor 384, effectively disabling the remainder of the balance circuit. However, when dump switch 190 is actuated, that emitter is placed at ground level and the balance circuit is activated. When activated, the pulses applied to the bases of transistors 380 and 384 cause their respective transistors to become highly conductive. Conduction of transistor 380 causes capacitor 394 to charge from second positive source V2 through resistors 387 and 389, while conduction of transistor 384 causes capacitor 394 to discharge to ground through resistor 388 and 389. Transistor 392 and its associated components are used as a voltage amplifier, producing at the drain a voltage inversely proportional to the voltage across capacitor 394. The drain voltage is, in turn, used to regulate the rate at which current is supplied through transistor 402 to capacitor 154.

The timer output pulses present at circuit point 155 are used to bias transistor 402. When circuit point 155 is at zero volts, transistor 402 is nonconductive, but when circuit point 156 is at a positive voltage, the emitter-base junction of transistor 402 is forward biased through resistors 408, 410 and 412 and the forward voltage drop across diode 406, thus causing a flow of current through the collector of that transistor onto capacitor 154. Variable resistor 410 permits convenient adjustment of the forward bias. However, a current is supplied from the drain of transistor 392 through resistor 404 which tends to reverse bias the emitter-base junction of transistor 402. The magnitude of the current supplied from transistor 402 to capacitor 154 is, then, inversely related to the voltage at the drain of transistor 342 and, therefore, directly related to the voltage across capacitor 394.

It will thus be seen that when the duration of the timer pulse is too long, transistor 380 is caused to conduct for a short period increasing both the voltage across the capacitor 394 and the rate of current flow to capacitor 154 through transistor 402 during the next following timer pulse, tending to decrease the duration of that following pulse. When the duration of the timer period is too short, transistor 384 is caused to conduct for a short period, decreasing both the voltage across the capacitor 394 and the rate of current flow to capacitor 154 through transistor 402 during the next following timer pulse, tending to increase the duration of that following pulse.

As mentioned above, circuitry may be provided within the moisture tester of this invention so that the moisture content of both cereal and feed grains may easily be measured on the same machine. In the embodiment of FIG. 3, that circuitry includes an NPN transistor 420 having its base coupled through a resistor 422 to first positive supply source V1 and through a switch 424 to ground. The emitter of transistor 424 is connected directly to ground while the collector is coupled both through a capacitor 426 to the non-grounded side of cell 24 and directly to the junction of resistors 310 and 311. Switch 424 is mechanically associated with the grain selection buttons 12 on the tester front panel so that it is closed when a button representing a cereal grain is actuated and opened when a button representing a feed grain is actuated.

When switch 424 is open, transistor 420 is conductive and capacitor 426 is effectively placed in parallel with grain cell 74. Variations in the relative capacity of the grain cell will, then, have a smaller effect on the frequency of oscillator 50. Moreover, the addition of capacitor 426 to the oscillator circuit lowers its frequency of operation and places it nearer the resonant frequency of network 24. The effect of the curvature correction circuit 66 on the operation of the tester circuit will, thus, be relatively greater when switch 424 is open, for feed grains, than when it is closed.

Opening of switch 424 also places the junction of resistors 310 and 311 practically at ground, thus shunting resistor 311 when the tester is in the balance mode. The resistor 310, which has a resistance significantly smaller than that of resistor 311, then becomes of significance in the operation of the intercept circuit, its net effect being to create a discharge path to ground for capacitor 154 when the tester is in the read mode, therefore lengthening the timer period and thus accounting for the relatively lower slope of the linear approximations for the feed grains.

Normally open switch 250 and normally closed switches 280 and 390 are provided for ease in calibrating the tester. They may conveniently be ganged together for simultaneous operation. For calibration, the tester is first allowed to come to a balanced state by actuating dump switch 192 and waiting until a constant reading of zero is obtained on the readout 36. Switch 390 is then opened so that capacitor 394 will maintain the voltage across it required for balance. Simultaneously, switch 250 is closed, enabling the recycle gate 88, and switch 280 is opened, forward biasing transistor 272 and effectively removing thermistor 68 from the temperature correction circuit. Both the balance circuit 60 and the temperature correction circuit 62 are, then, disabled and the timer 58 is continually recycled. The correct ones of variable resistors 304 and 338 corresponding to a single particular grain are then selected by depressing one of the buttons 12 whose operation is symbolically shown at switches 70 and 72 in FIG. 3. With the tester still in what would normally be the balance mode, caused by the actuation of dump switch 192, the intercept circuit is also effectively disabled since transistor 302 is cut off, and the reading obtained on the readout unit will be independent of the adjustment of the selected one of resistors 304. The selected one of resistors 338 is then adjusted until a first predetermined reading is obtained on readout unit 36. The load switch 190 is then depressed placing the tester in which would normally be the read mode and the selected one of resistor 304 is adjusted until a second predetermined reading is obtained. That process is repeated for each of the selected pairs of resistors 304 and 338, the first and second predetermined readings being different for each type of grain. The tester may then be placed in operation by returning switches 250, 280 and 390 to their normal position.

Summarizing, then, the moisture tester of this invention accounts for the different physical properties and temperatures of the grain which may be tested by altering the length of the timer period. The counter and display units are such as to yield a count inversely related to the number of pulses generated by oscillator 50 during any timer period and thus directly related to the grain moisture content. The slope of the linear approximation to the grain moisture versus relative grain cell capacity is taken into consideration through establishment of the nominal timer period. Variations in the nominal period account for variations in the slope between cereal and feed grains. In the tester described, the change in nominal timer period is achieved by effectively placing resistor 130 across capacitor 154 to increase the timer period and thus decrease the slope. Differences in vertical intercept of the linear approximation, caused by either the different physical properties of different grains or variation in the temperature of a single grain, would ideally be accounted for by addition or subtraction of a fixed number from the count of counter 202 or display 36. In the disclosed circuit, however, differences in vertical intercept are accounted for by small changes in the timer period which, because the changes in frequency of oscillator 50 are relatively small, approximates the desired result. Shortening the period will effectively raise the intercept, while lengthening it will lower the intercept. Finally, the upwardly bowed nature of the actual grain moisture versus relative cell capacity curves is accounted for by making relatively small changes in the timer period depending on the relative capacity of the grain cell. The period is shortened the maximum amount at the point where the difference of the actual curve from its linear approximation is at a maximum.

It will be apparent that many variations may be made in the circuitry of apparatus employing this invention. Some possible alternatives are disclosed in FIGS. 6, 7 and 8, each showing, respectively, an alternative temperature correction circuit, balance circuit, and oscillator.

Figure 6:
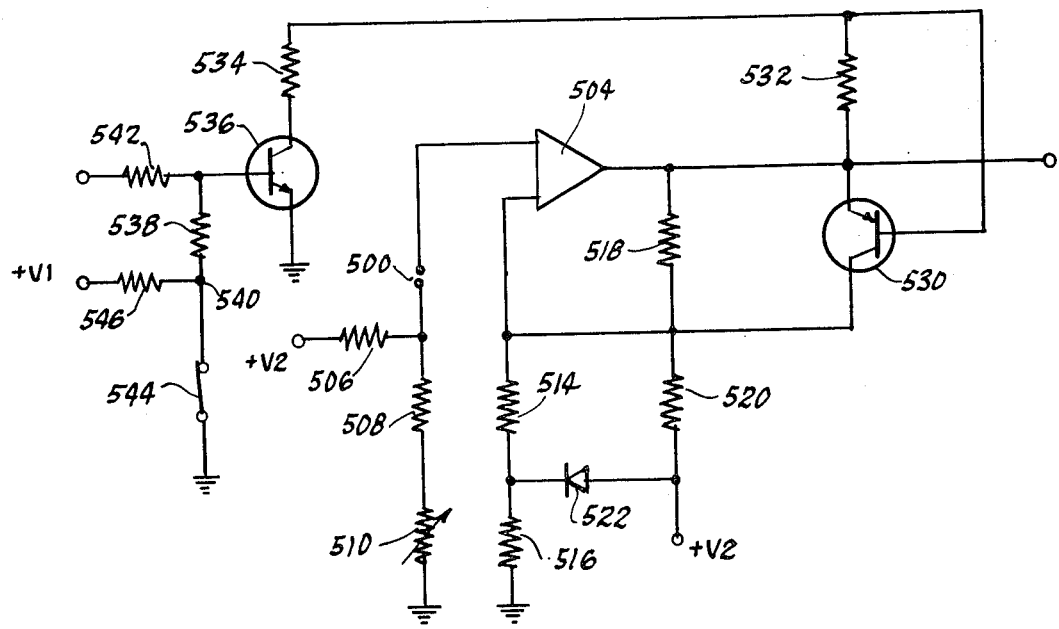
FIGS. 6, 7 and 8 are schematic diagrams of alternative circuit portions for use within the moisture tester of FIG. 1.

The temperature correction circuit of FIG. 6 utilizes a ribbon type thermocouple 500 as the temperature sensing element rather than a thermistor. The thermocouple comprises two approximately equal length bands of dissimilar metal, usefully chromel and constantan, disposed end-to-end and joined together as by spot welding, to form a single, elongate band. The thermocouple is placed within the grain cell for physical contact with the grain under test. It may be twisted into a spiral shape and suspended between two electrically insulating supports 502 attached to the cell inner electrode 28, as shown in FIG. 2. The chromel side of the thermocouple is then coupled to a first input of an operational amplifier 504. The constantan side is coupled both through a resistor 506 to a second positive supply source V2 and through the series combination of a resistor 508 and a variable resistor 510 to ground. A second input of operational amplifier 504 is coupled to ground through the series combination of resistors 514 and 516. The output of operational amplifier 504 is coupled through the series combination of resistors 518 and 520 to positive supply V2. Diode 522 is coupled from positive supply V2 to the junction of resistors 514 and 516 and oriented for high positive conductivity toward that junction. The operational amplifier is used as a d.c. differential amplifier. Resistor 518 is the feedback element, and its value, in combination with the amplifier input resistances, determines the gain through the amplifier. The network including resistors 514, 516 and 520 and diode 522 are operative to produce a d.c. offset at the amplifier output. Variable resistor 510 may be used to calibrate the temperature correction circuit and adjust the output of amplifier 504 to a predetermined value when thermocouple 500 is at a known temperature. The variation in the resistance of diode 522 with temperature is used to compensate for the voltages generated at the dissimilar metallic junctions used to connect thermocouple 500 into the remainder of the temperature correction circuit.

Circuitry is also provided for disabling the temperature correction circuit when the tester is in the balance mode. A PNP transistor 530 has its emitter connected to the output of amplifier 504 and its collector connected to the second input of that amplifier. The base of transistor 530 is coupled both through a resistor 532 to the output of amplifier 504 and through a resistor 534 to the collector of an NPN transistor 536. The emitter of transistor 536 is connected to ground; the base is coupled through a resistor 538 to a circuit point 540 and through a resistor 542 to output 86 of load/dump flip-flop 80. Circuit point 540 is coupled both to ground through a normally closed switch 544 and to the first positive supply V1 through a resistor 546.

When the tester is in the read or load state, output 86 of load/dump flip-flop 80 is at a relatively low voltage placing the base of transistor 536 at a relatively low voltage and making that transistor relatively nonconductive. Little current will then flow through resistor 532 so the base and emitter of transistor 530 will be at approximately the same voltage. The collector-emitter resistance of transistor 530 will, thus, be large relative to the value of resistor 518 and will have relatively little effect on the feedback path of operational amplifier 504. When output 86 of the load/dump flip-flop 80 is at a relatively high voltage indicating the tester is in the dump or balance state, the base-emitter junction of transistor 536 is heavily forward biased permitting a large positive current flow through resistor 532 and making the emitter of transistor 530 positive with respect to its base. The emitter-collector resistance of transistor 530 is, thus, very low and feedback resistor 518 is effectively shorted out. The gain of amplifier 504 is thereby reduced to a very low value and no incremental signal appears at the output of amplifier 504. The tester circuit is, thus, allowed to come to a blanaced state with the temperature correction circuit effectively disabled.

Switch 544 is opened to calibrate the tester. With that switch open, a positive voltage is applied to the base of transistor 536 disabling the temperature correction circuitry no matter what the state of load/dump flip-flop 80.

The temperature correction circuit of FIG. 6 has some significant advantages over that shown in FIG. 5. The thermocouple 500 is of much greater physical size than the thermistor 68. More of the grain under test will, thus, come in contact with the temperature sensitive element in the circuit of FIG. 6 than in that of FIG. 5, and variations in temperature within the test sample will tend to cancel out. Moreover, variations in packing of the individual grains about the temperature sensitive element will have less effect on the results obtained. Finally, the response time of the thermocouple is significantly less than that for the thermistor, permitting a reduction in the delay introduced by delay timer 84. In any particular application of this invention, these advantages must, of course, be weighed against the added cost of the operational amplifier required by the relatively low voltage-temperature gradient of the thermocouple.

Figure 7:
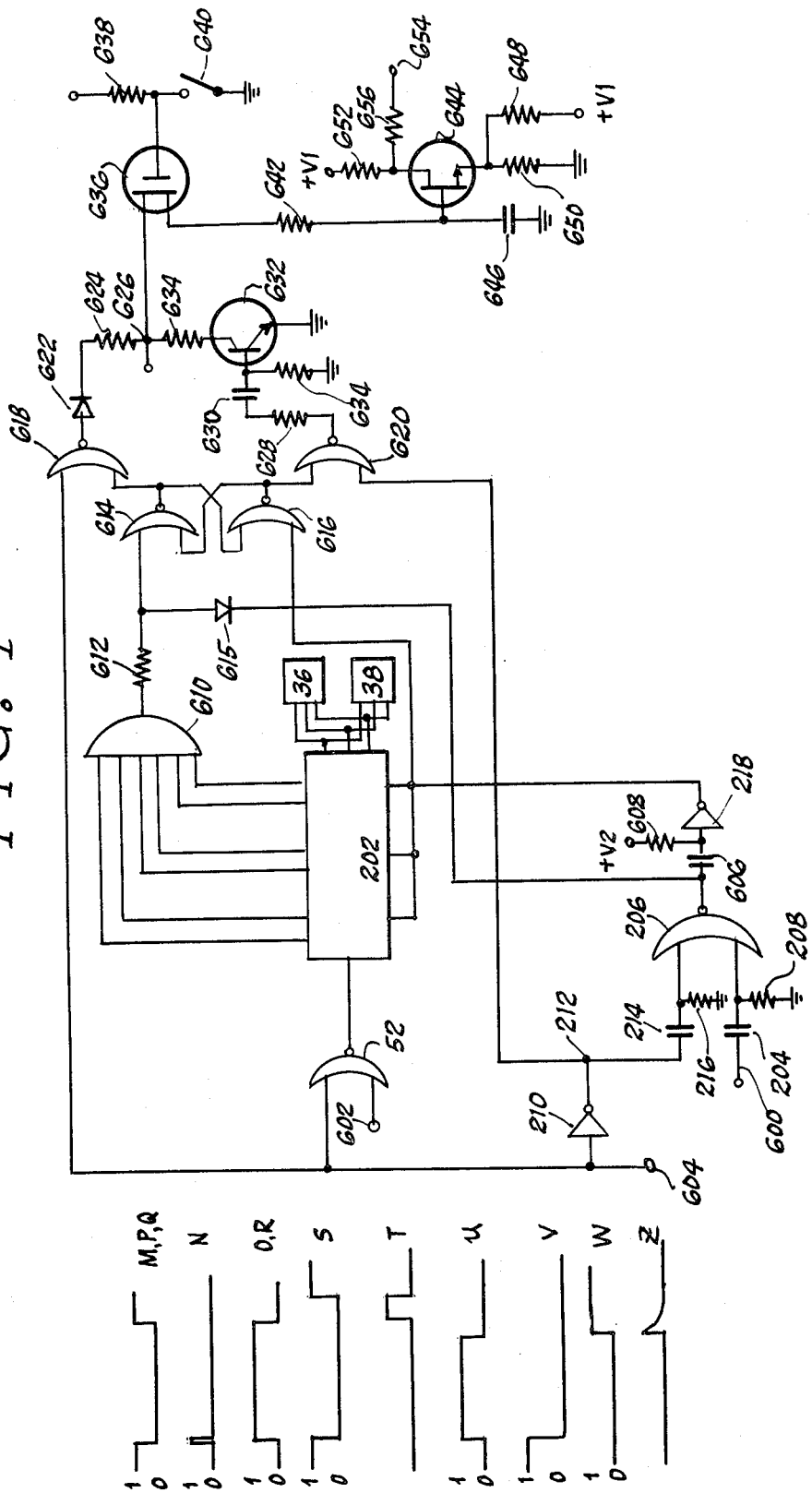

FIG. 7 discloses an alternative balance circuit 60 for use in apparatus of this invention. It is intended for use in circuits where the operating characteristics of oscillator 50 and timer 58 are chosen so that 1,000 cycles of oscillator 50 occur during one timer period. Also shown in FIG. 7 are gate and counter circuits 52 and 54 similar to those shown in FIG. 2; similar components are similarly numbered and will not be further discussed. As in the embodiment of FIG. 2, capacitor 204, here connected to circuit point 600, is coupled to output 82 of load/dump flip-flop 80; the first input of gate 52, here connected to circuit point 602, is coupled to the output of oscillator 50; and the second input of gate 52 and the input of inverter 210, here connected to circuit point 604, are coupled to the inverted output of timer 58. The counter circuit 54 includes an additional isolating capacitor 606 coupling the output of NOR gate 206 to the input of inverting amplifier 218 and a resistor 608 coupling that input to second positive supply source V2.

The binary coded decimal outputs of counter 202 representative of the count 999 are connected to the inputs of a six input AND gate 610. The output of AND gate 610 is coupled through a resistor 612 to a first input of a two input NOR gate 614 which, in turn, is connected through a diode 615 to the output of NOR gate 206. Diode 615 is oriented for high positive conductivity toward the output of NOR gate 206 and prevents the first input of NOR gate 614 from going positive when the output of NOR gate 206 is at a low voltage. The output of inverter 218 is coupled to a first input of a two input NOR gate 616. The output of NOR gate 614 is connected to the second input of NOR gate 616 and a first input of a two input NOR gate 618, while the output of NOR gate 616 is connected to a second input of NOR gate 614 and a first input of a two input NOR gate 620. It will be seen that NOR gates 614 and 616 are connected together as a flip-flop. A second input of NOR gate 618 is connected to circuit point 604; a second input of NOR gate 620 is connected to circuit point 212.

The output of NOR gate 618 is coupled through the series combination of a diode 622 oriented for high positive conductivity away from that output and a resistor 624 to a circuit point 626. The output of NOR gate 620 is coupled through the series combination of a resistor 628 and a capacitor 630 to the base of an NPN transistor 632 and, in turn, through a resistor 634 to ground. The emitter of transistor 632 is connected directly to ground and the collector is coupled through a resistor 634 to circuit point 626.

Circuit point 626 is connected to the source element of an N channel MOS field effect transistor 636. The gate element of that transistor is coupled both to output 82 of load/dump flip-flop 80 through a resistor 638 and to ground through a normally open switch 640. The drain element of that transistor is coupled through a resistor 642 to the gate element of a P type junction field effect transistor 644 and, in turn, through a capacitor 646 to ground. The source element of transistor 644 is coupled to the junction point of resistors 648 and 650 forming a voltage divider between the first positive supply source V1 and ground. The drain element of that transistor is coupled through a resistor 652 to the first positive supply source V1 and to circuit point 654 through a resistor 656. The output of the balance circuit is taken from circuit point 654.

As in the circuit of FIG. 5, when a signal is applied to the reset inputs of counter 202 at the onset of each timer period, the counter is set to 999 thus causing the output of AND gate 610 to assume a relatively high voltage, logic level 1 state. However, the output of NOR gate 206 is at a relatively low voltage, logic level 0 state at the onset of the timer period. Diode 615 thus maintains the first input of flip-flop 614 at logic level 0. The reset pulse of logic level 1 applied from the output of inverter 218 then causes the output of NOR gates 614 and 616 to assume logic levels 1 and 0, respectively.

When the tester circuit is in a balanced condition, 1,000 oscillator pulses will occur during each timer period. Counter 202 will then be returned to a 999 count and the output of AND gate 610 will be returned to logic level 1 at the end of each timer period. The output of AND 610 will then appear as at M in FIG. 7. The output of inverter 218 appears as at N. The outputs of NOR gates 614 and 616 applied to the first inputs of gates 618 and 620, respectively, appear at O and P. The inverted timer signal and the timer signal present at the second inputs of NOR gates 618 and 620, respectively, are shown at Q and R. The signals present at the inputs of NOR gates 618 and 620 are then combined according to the gate function so that the output of each gate is a constant, low voltage, logic level 0 signal.

When, however, the timer period is too long, the signal applied to the second input of NOR gate 618 appears as at S. Further, at the end of the period the count on counter 202 will pass through 999 and continue on. The logic level 1 pulse emitted from AND gate 610 will cause the output of gate 614 to return to logic level 0, and the signal at that output will continue to be as at 0. NOR gate 618 will then combine signals S and 0 into a signal represented at T having a positive, logic level 1 pulse.

When the timer period is too short, the signal applied to the second input of NOR gate 620 will appear as at U. Further, counter 202 will never achieve a count of 999 30 that the output of NOR gate 616 may be represented at V. NOR gate 620 combines signals U and V into a signal W having a positive going level change. That signal is altered by the differentiating network of capacitor 630 and resistor 634 into a positive pulse at the base of transistor 632 shown at Z. Thus when the timer period is too long, a positive going pulse appears at the output of NOR gate 618, but when the timer period is too short, a positive going pulse appears at the base of transistor 632.

These pulses are used to vary the length of the timer period. When the load/dump flip-flop is in the dump state, output 86 is at a relatively high voltage and transistor 636 is conductive. A positive pulse at the output of NOR gate 618 will charge capacitor 646 while a positive pulse at the base of transistor 632 will cause it to dishcharge through that transistor. Transistor 644 is used to scale the voltage across capacitor 646 and isolate the capacitor from subsequent circuitry. The output is taken from circuit point 654 and may be suitably applied to the timer. When the gate of transistor 636 is placed at ground level, either by placing load/dump flip-flop 80 in the load state or closing normally open switch 640 to calibrate the tester, transistor 636 becomes nonconductive and capacitor 646 maintains the voltage then across it.

Figure 8:
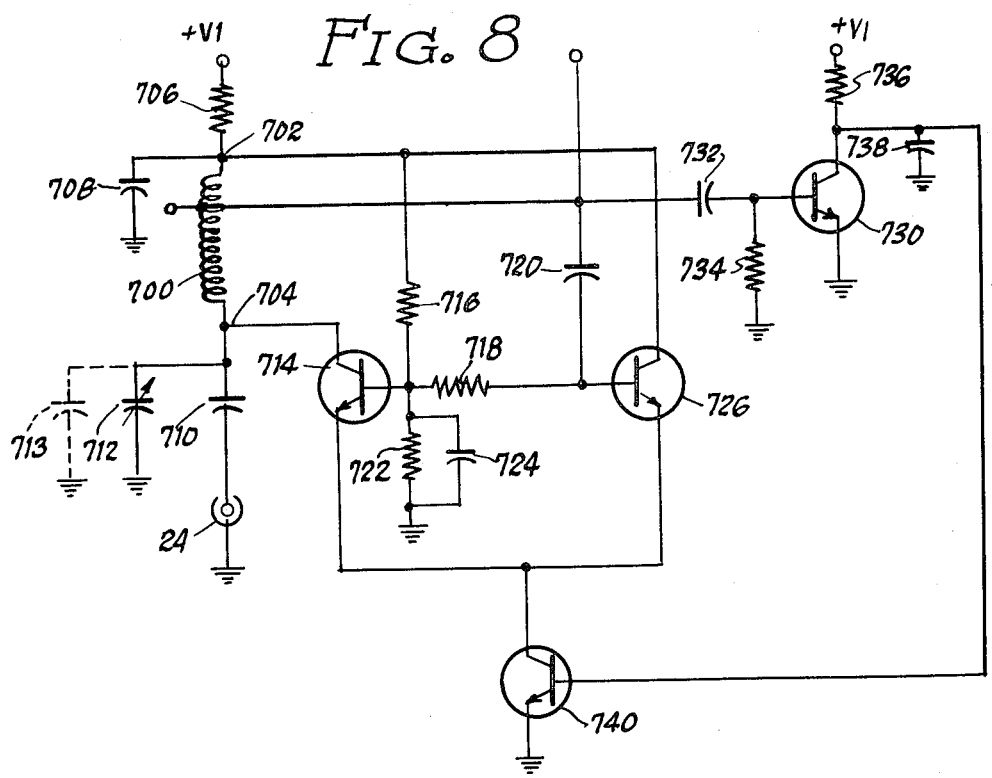

FIG. 8 discloses an alternative oscillator and regulator circuit which may be used with this invention. The circuit includes a coil 700 connected between two circuit points 702 and 704. Circuit point 702 is connected both through resistor 706 to first positive supply source V1 and through capacitor 708 to ground, while circuit point 704 is coupled to ground both through the series combination of a capacitor 710 and grain cell 24 and through a variable capacitor 712 and to the collectr of an NPN transistor 714. The base of transistor 714 is coupled to circuit point 702 through a resistor 716, to a tap on coil 700 through the series combination of a resistor 718 and a capacitor 720, and to ground through the combination of a resistor 722 and a capacitor 724 in parallel. Another NPN transistor 726 is included in the circuit having its collector connected to circuit point 702, its emitter connected to the emitter of transistor 714 and its base connected to the junction of resistor 718 and capacitor 720. The components as thus far described form the basic elements of a relatively conventional LC oscillator using the differential amplifier of transistors 714 and 726 as the amplifying means. The oscillator output is taken from the tap on coil 700. Capacitor 708 maintains circuit point 702 at a.c. ground so that coil 700 and the network of capacitors 710 and 712 and cell 24 are effectively in parallel. Additional circuitry may be provided to effectively place a capacitor 713, shown dotted in FIG. 8, in parallel with capacitor 712 for testing of feed grains.

The circuit of FIG. 8 also includes additional components to maintain the amplitude of the oscillator output relatively constant with variations in the impedance of the grain cell. These include an NPN transistor 730 having its base coupled through a capacitor 732 to the tap on coil 700 and through a resistor 734 to ground, its emitter connected directly to ground, and its collector coupled through a resistor 736 to first positive supply source V1, through capacitor 738 to ground, and directly to the base of an NPN transistor 740. The emitter of transistor 740 is connected to ground while its collector is connected to the emitter of transistors 714 and 726.

Transistor 730 produces at its collector a d.c. signal inversely proportional to the peak-to-peak value of the signal at the oscillator output, the a.c. signal being removed by capacitor 738. That signal is used to control the conduction of the collector-emitter circuit of transistor 740 and, thus, the total current flowing through the output circuits of transistors 714 and 726. Thus as the magnitude of the oscillator output signal tends to increase, the current flow through transistors 714 and 726 will be reduced tending to decrease the oscillator output amplitude, and vice versa.

It will thus be seen that a frequency measuring circuit has been provided in which the relationship between the circuit output and the input signal frequency may be conveniently altered in response to a plurality of different input parameters. More specifically, a grain moisture tester has been provided which has its output in an easily usable form, which may easily be adopted by the user to measure the moisture content of a wide variety of different types of grain, which compensates for variations in the temperature of the grain being tested, and which automatically compensates for changes in the circuit parameters of the components within the tester. However, it will be obvious that many modifications of the specific embodiment shown may be made without departing from the spirit and scope of the invention. For example, the individual details of the circuit disclosed are subject to wide variation. The logical arrangement of the circuit units may be altered. The grain cell used may have any one of a number of shapes. Finally, circuitry could well be added to refine the approximations used in development of the disclosed circuit.

While a particular embodiment of this invention is shown above, it will be understood, of course, that the invention is not to be limited thereto since many modifications may be made. It is contemplated, therefore, by the appended claims, to cover any such modifications as fall within the true spirit and scope of this invention.

I claim:

1. An electrical signal frequency measuring circuit for translating the frequency of an applied signal representative of a measured parameter into a direct reading of that parameter wherein the relationship between the applied signal frequency and the measured parameter may vary in a known manner comprising:

timer means for generating a characteristic electrical signal of predetermined period;
   control means for electrically controlling the duration of said period;
   indicating means coupled to said timer means for counting the number of cycles of said applied signal occurring during said predeterined period;
   period altering means coupled to said control means for altering said period in accord with variations in the relationship between said applied signal frequency and said measured parameter;
   recycle means for causing said timer means to periodically generate said characteristic signal of predetermined duration;
   balance means coupled to said indicating means and said period controlling means for adjusting the length of said predetermined period to achieve a given count in said indicating means at the end of said period; and
   means for alternately enabling and disabling said balance means.

2. An impedance measuring circuit wherein the measured impedance is related in a known but variable way to a physical parameter and said circuit gives a direct reading of the physical parameter and comprising:

timer means for generating a characteristic electrical signal of predetermined period;
   control means for electrically controlling the duration of said period;
   oscillator means including said impedance as a frequency determining element;
   indicating means coupled to said timer means and said oscillator for counting the number of cycles of said oscillator occurring during said predetermined period;
   period altering means coupled to said control means for altering said period in accord with variations in the relation between said measured impedance and said physical parameter;
   recycle means for causing said timer means to periodically generate said charateristic signal of predetermined duration;
   balance means coupled to said indicating means and said period controlling means for adjusting the length of said predetermined period to achieve a given count in said indicating means at the end of said period; and
   means for alternately enabling and disabling said balance means.

3. A moisture tester operative to determine the moisture content of the material under test by measuring one of the electrical properties of said material and including provisions for measuring the moisture content of different materials having a plurality of relationships between moisture content and said measured electrical property comprising:

a cell for receiving an amount of the material to be tested;
   an oscillator including said cell as a frequency determining element thereof;
   means for generating an electrical signal having a period of predetermined duration;
   means for indicating the number of cycles generated by said oscillator during said period;
   means for controlling the duration of said period; and
   material selection means coupled to said period controlling means for altering said period in accord with the nature of the particular relationship between moisture content and said measured electrical property for the particular material under test.

4. The moisture tester of claim 3 wherein said material selection means is comprised of slope selection means for altering said period in accord with the slope of a linear approximation of the particular relationship between moisture content and said measured electrical property for the material under test.

5. The moisture tester of claim 3 wherein said material selection means is comprised of intercept selection means for altering said period in accord with the intercept of a linear approximation of the particular relationship between moisture content and said measured electrical property for the material under test.

6. The moisture tester of claim 3 further comprising nonlinear correction means for altering said period by an amount related to the frequency of operation of said oscillator.

7. The moisture tester of claim 6 wherein said material selection means is comprised of curvature selection means for adjusting the magnitude of the period alteration created by said nonlinear correction means.

8. A moisture tester operative to determine the moisture content of the material under test by measuring one of the electrical properties of said material and comprising:
- a cell for receiving an amount of the material to be tested;
- an oscillator including said cell as a frequency determining element thereof;
- means for generating an electrical signal having a period of predetermined duration;
- means for indicating the number of cycles generated by said oscillator during said period;
- means for controlling the duration of said period;
- means for causing said generating means to periodically generate said signal of predetermined duration;
- balance means coupled to said indicating means and said period controlling means for adjusting the duration of said predetermined period to achieve a given indication on said indicating means at the termination of said signal establishing a reference operating condition for said tester; and
- means for alternately enabling and disabling said balance means.

9. A grain moisture tester operative to determine the moisture content of a plurality of different types of grain by measuring the dielectric constant of the grain under test and comprising:
- a capacitive cell for receiving an amount of the grain to be tested;
- an oscillator including said cell as a frequency determining element thereof;
- timer means for generating an electrical signal having a period of predetermined duration;
- gate means coupled to the output of said timer means and said oscillator and passing the output of said oscillator only during the presence of said timer signal;
- counter means coupled to the output of said gate means for indicating the number of cycles of said oscillator occurring during said timer signal;
- means for controlling the duration of said timer signal period; and
- grain selection means coupled to said period controlling means for altering said period in accord with the nature of the particular relationship between moisture content and dielectric constant for the grain under test.

10. The grain moisture tester of claim 9 wherein said grain selection means is comprised of slope selection means for altering said period in accord with the slope of a linear approximation to the particular relationship between moisture content and dielectric constant for the grain under test.

11. The moisture tester of claim 9 wherein said grain selection means is comprised of intercept selection means for altering said period in accord with the intercept of a linear approximation to the particular relationship between moisture content and dielectric constant for the material under test.

12. The moisture tester of claim 9 further comprising nonlinear correction means coupled to said period controlling means for altering said period by an amount related to the frequency of operation of said oscillator.

13. The moisture tester of claim 12 wherein said grain selection means is comprised of curvature selection means for adjusting the magnitude of the period alteration caused by said nonlinear correction means.

14. The grain moisture tester of claim 9 further comprising temperature correction means coupled to said timer period controlling means for altering said period by an amount related to the temperature of the grain being tested.

15. The grain moisture tester of claim 9 wherein said temperature correction means comprises a ribbon thermocouple couple disposed within said capacitive cell and operatively coupled to said timer means for altering the duration of said period.

16. A grain moisture tester operative to determine the moisture content of the grain under test by measuring the dielectric constant of said grain and comprising:
- a capacitive cell for receiving an amount of the grain to be tested;
- an oscillator including said cell as a frequency determining element thereof;
- timer means for generating an electrical signal having a period of predetermined duration;
- gate means coupled to the output of said timer means and said oscillator and passing the output of said oscillator only during the presence of said timer signal;
- counter means coupled to the output of said gate means for indicating the number of cycles of said oscillator occurring during said timer signal;
- means for controlling the duration of said timer signal period;
- recycling means for periodically actuating said timer means;
- balance means coupled to said counter means and said period controlling means and responsive to the indication given on said counter means at the end of each timer period to adjust said timer period to achieve a given indication at the end of each timer period; and
- means for alternately enabling and disabling said balance means.

17. A grain moisture tester oprative to give a direct reading of the moisture content of the grain under test by measuring the dielectric constant of said grain and capable of measuring the moisture content of a plurality of different grains having a plurality of relationships between moisture content and dielectric constant and comprising:
- a capacitive cell for receiving an amount of the grain to be tested;
- an oscillator including said cell as a frequency determining element thereof;
- timer means for generating an electrical signal having a period of predetermined duration;
- gate means coupled to the output of said timer means and said oscillator for passing the output of said oscillator only during the presence of said timer signal;
- counter means coupled to the output of said gate means for indicating the number of cycles of said oscillator occurring during said timer signal;
- means for controlling the duration of said timer signal period;
- recycle means for periodically actuating said timer means;
- balance means coupled to said counter means and period controlling means and responsive to the indication given on said counter means at the end of said timer period to adjust said timer period to achieve a given indication at the end of each timer period;

disabling means for alternately enabling and disabling said balance means;

temperature correction means coupled to said timer period controlling means for altering said period by an amount related to the temperature of the grain being tested;

nonlinear correction means coupled to said period controlling means for altering said period by an amount related to the frequency of operation of said oscillator; and grain selection means coupled to said period controlling means and comprising slope selection means for altering said period in accord with the slope of a linear approximation to the particular relationship between moisture content ane dielectric constant for the grain under test, intercept selection means for altering said period in accord with the intercept of said linear approximation, and curvature selection means for adjusting the magnitude of the period alteration caused by said nonlinear correction means in accord with the magnitude of the departure of said particular relationship between moisture content and dielectric constant from said linear approximation.

18. A moisture tester for determining the moisture content of a material under test by measuring an electrical property of said material and including provisions for measuring the moisture content of different materials having a plurality of relationships between moisture content and said measured electrical property comprising:

means for producing an alternating electrical signal having a predetermined nominal frequency;

means for producing an electrical signal having a predetermined nominal period of duration such that a nominal number of cycles at said predetermined nominal frequency occur during said predetermined nominal period;

means for altering said nominal number in accord with the nature of the relationship between moisture content and said measured electrical property for the material under test;

means for receiving an amount of the material under test and altering the number of cycles of said alternating electrical signal occurring during said period; and means for counting the number of cycles in said alternating electrical signal occurring during said period and indicating the moisture content of the material under test.

19. A grain moisture tester for determining the moisture content of a plurality of different types of grain by measuring the dielectric constant of the grain under test and comprising:

means for producing an alternating electrical signal having a predetermined nominal frequency;

means for producing an electrical signal having a predetermined nominal period of duration such that a nominal number of cycles at said predetermined nominal frequency occur during said predetermined nominal period;

means for altering said nominal number in accord with the nature of the particular relationship between moisture content and dielectric constant for the grain under test;

means for receiving an amount of the material under test and altering the number of cycles of said alernating electrical signal occurring during said period; and means for counting the number of cycles in said alternating electrical signal occurring during said period and indicating the moisture content of the grain under test.

* * * * *

UNITED STATES PATENT OFFICE
CERTIFICATE OF CORRECTION

Patent No. 3,761,810  Dated September 25, 1973

Inventor(s) GEORGE H. FATHAUER

It is certified that error appears in the above-identified patent and that said Letters Patent are hereby corrected as shown below:

Column 17, line 28, Delete "grain cell 74" and insert therefor --grain cell 24--;

Column 17, line 33, Delete "network 24" and insert therefor --network 74--;

Column 18, line 9, Delete "which" and insert therefor --what--;

Column 19, line 66, Delete "blanaced" and insert therefor --balanced--;

Column 21, line 41, After "AND" insert --gate--;

Column 21, line 64, Delete "30" and insert therefor --so--;

Column 22, line 13, Delete "dishcarge" and insert therefor --discharge--;

Column 22, line 31, Delete "collectr" and insert therefor --collector--;

Column 26, line 9, After "thermocouple" delete "couple";

Column 27, line 17, Delete "ane" and insert therefor --and--.

Signed and sealed this 6th day of August 1974.

(SEAL)
Attest:

McCOY M. GIBSON, JR.
Attesting Officer

C. MARSHALL DANN
Commissioner of Patents